United States Patent
Witham et al.

(10) Patent No.: US 10,677,467 B2
(45) Date of Patent: Jun. 9, 2020

(54) COOLING APPARATUS FOR A FUEL INJECTOR

(71) Applicant: ROLLS-ROYCE plc, London (GB)

(72) Inventors: Frederic Witham, Bristol (GB); Pierre Hilt, Saint Avold (FR); Steven P. Jones, Bristol (GB); Jonathan M. Gregory, Cheltenham (GB); Timothy Minchin, Bristol (GB)

(73) Assignee: ROLLS-ROYCE PLC, London (GB)

(*) Notice: Subject to any disclaimer, the term of this patent is extended or adjusted under 35 U.S.C. 154(b) by 478 days.

(21) Appl. No.: 15/245,035

(22) Filed: Aug. 23, 2016

(65) Prior Publication Data
US 2017/0067641 A1 Mar. 9, 2017

(30) Foreign Application Priority Data
Sep. 8, 2015 (GB) .................................. 1515883.5

(51) Int. Cl.
*F23R 3/14* (2006.01)
*F23R 3/58* (2006.01)
(Continued)

(52) U.S. Cl.
CPC .................. *F23R 3/58* (2013.01); *F02C 3/04* (2013.01); *F23R 3/14* (2013.01); *F23R 3/283* (2013.01);
(Continued)

(58) Field of Classification Search
CPC .... F23R 3/14; F23R 3/20; F23R 3/283; F23R 2900/03041; F23R 2900/03043; F23R 2900/03044; F23R 2900/03045
See application file for complete search history.

(56) References Cited

U.S. PATENT DOCUMENTS

| 4,843,825 A | 7/1989 | Clark |
| 5,129,231 A | 7/1992 | Becker et al. |

(Continued)

FOREIGN PATENT DOCUMENTS

| FR | 2 678 715 A1 | 1/1993 |
| GB | 2 073 398 A | 10/1981 |
| WO | 2011/092779 A1 | 8/2011 |

OTHER PUBLICATIONS

Jan. 25, 2017 Search Report issued in European Patent Application No. 16 18 5291.
(Continued)

*Primary Examiner* — Arun Goyal
(74) *Attorney, Agent, or Firm* — Oliff PLC (57) ABSTRACT

An annular air swirler configured to receive a fuel injector in a central bore. The swirler has one or more annular channels, defined by radially facing channel walls and having an inlet for receiving compressed air and an axially distal outlet. The channel walls converge inwardly towards the outlet and swirl vanes extend between opposing faces of the walls. The swirler turns incoming air to create a vortex at the channel outlet. An annular cooling apparatus associated with the air swirler is arranged axially adjacently downstream of the channel outlet(s), and includes a skirt portion radially spaced from a converging portion of the outermost channel wall defining a converging portion of a bowed coolant channel. A radially outwardly extending wall connects with the outermost channel wall and, with a face of the skirt portion, defines a radially outwardly extending portion of the bowed coolant channel adapted for increased heat exchange.

16 Claims, 6 Drawing Sheets

(51) Int. Cl.
*F23R 3/28* (2006.01)
*F02C 3/04* (2006.01)

(52) U.S. Cl.
CPC .............. *F23R 2900/03041* (2013.01); *F23R 2900/03043* (2013.01); *F23R 2900/03044* (2013.01); *F23R 2900/03045* (2013.01); *Y02T 50/675* (2013.01)

(56) References Cited

U.S. PATENT DOCUMENTS

| | | | |
|---|---|---|---|
| 6,032,457 | A | 3/2000 | McKinney et al. |
| 7,707,832 | B2 | 5/2010 | Commaret et al. |
| 9,285,122 | B2 * | 3/2016 | Jones .................... F23D 11/383 |
| 9,303,876 | B2 * | 4/2016 | Hernandez ................ F23R 3/14 |
| 9,310,080 | B2 * | 4/2016 | Toon ........................ F23R 3/14 |
| 9,915,429 | B2 * | 3/2018 | Toon ........................ F23R 3/283 |
| 2003/0061815 | A1 | 4/2003 | Young et al. |
| 2006/0064983 | A1 | 3/2006 | Currin et al. |
| 2011/0203294 | A1 | 8/2011 | Cameriano et al. |
| 2017/0009995 | A1 * | 1/2017 | Witham .................... F02C 3/00 |

OTHER PUBLICATIONS

Feb. 19, 2016 Search Report issued in British Patent Application No. 1515883.5.

* cited by examiner

COOLING APPARATUS FOR A FUEL INJECTOR

TECHNICAL FIELD

The present disclosure concerns the cooling of combustor components in a gas turbine engine and more particularly to a novel arrangement for simultaneously cooling a fuel spray nozzle and combustor heat shield.

BACKGROUND OF THE INVENTION

In a gas turbine engine, ambient air is drawn into a compressor section. Alternate rows of stationary and rotating aerofoil blades are arranged around a common axis, together these accelerate and compress the incoming air. A rotating shaft drives the rotating blades. Compressed air is delivered to a combustor section where it is mixed with fuel and ignited. Ignition causes rapid expansion of the fuel/air mix which is directed in part to propel a body carrying the engine and in another part to drive rotation of a series of turbines arranged downstream of the combustor. The turbines share rotor shafts in common with the rotating blades of the compressor and work, through the shaft, to drive rotation of the compressor blades.

It is well known that the operating efficiency of a gas turbine engine is improved by increasing the operating temperature. The ability to optimise efficiency through increased temperatures is restricted by changes in behaviour of materials used in the engine components at elevated temperatures which, amongst other things, can impact upon the mechanical strength of the components. This problem is addressed by providing a flow of coolant about these components. It is known to take off a portion of the air output from the compressor (which is not subjected to ignition in the combustor and so is relatively cooler) and feed this to surfaces of components downstream which are likely to suffer damage from excessive heat.

Within the combustor section rapidly flowing air is directed towards the fuel spray nozzle. Sprayed fuel and the air are mixed and delivered to a combustion chamber where the mixture is ignited. A heat shield is arranged around the nozzle exit and the front of the combustion chamber to further assist in protecting the combustor components from heat damage. The fuel spray and hot gases exiting the nozzle (prior to ignition) provides an additional cooling effect between the nozzle exit and the combustion chamber. In known combustor arrangements, flow onto the cooler side of the heat shield is metered by a meter panel. Typically the meter panel consists of a metal sheet perforated with 100's of drilled holes.

Fuel injection components and components of the combustion chamber are typically coupled by floating seals which allow relative movement between the components which can occur due to differential expansion of components at elevated temperatures. With improvements in fuel delivery and fuel/air mixing, higher burn temperatures have been achieved and consequently, improved cooling systems are needed to maintain mechanical integrity of the fuel delivery and combustor components. Furthermore, floating seals are susceptible to corrosion and wear as a consequence of the increased temperatures and consequently become less effective and less reliable.

STATEMENT OF THE INVENTION

The present invention provides an annular air swirler configured to receive a fuel injector in a central bore thereof, the air swirler having one or more annular channels, with each annular channel defined by radially facing channel walls and having an inlet for receiving compressed air and an axially distal outlet, the channel walls converging radially inwardly towards the outlet, swirl vanes extending between opposing faces of the radially facing walls and configured for turning incoming air to create a vortex at the channel outlet, and an annular cooling apparatus associated with the air swirler and arranged axially adjacently downstream of the channel outlet(s), the cooling apparatus comprising a skirt portion radially spaced from a converging portion of the radially outermost channel wall defining a radially converging portion of a bowed coolant channel, and a radially outwardly extending wall connected with the radially outermost channel wall adjacent the outlet and defining with a radially extending face of the skirt portion, a radially outwardly extending portion of the bowed coolant channel, the bowed coolant channel being adapted for increased heat exchange and configured to direct air across the radially outermost channel wall and the radially outwardly extending wall whereby, in use, to shield the air swirler and any accommodated fuel injector from heat generated in the combustion chamber.

The radially outwardly extending wall serves as a heat shield protecting upstream components from heat generated in the downstream combustion chamber. Since the bowed channel extends between the nozzle of the air swirler and the heat shield, it provides cooling for both components.

In contrast to the prior art arrangements which, as discussed, use a perforated metering panel to direct axially flowing air onto a heat shield and cool the heat shield by impingement, the bowed channel of the invention is configured to turn air radially presenting radial jets of air across the heat shield cooling it predominantly by conduction. Similarly, cooling air jets flow radially inwardly across the radially outermost channel wall of the air swirler to assist in protecting the fuel nozzle from excessive heat exposure.

When arranged for use (for example, but without limitation) in a gas turbine engine, the bowed coolant channel receives compressed air from the compressor into the radially converging section via one or more axially upstream facing inlets, conveniently the inlets comprise an annular arrangement of inlet ports provided in an upstream facing end wall of the coolant channel. The compressed air travels along the bow and through one or more outlets at the radially outermost end of the radially extending portion. Conveniently, the outlets may comprise a circumferential array of outlet ports in a radially outermost endwall of the radially extending portion. In more complex embodiments, each outlet port may exit to an outlet conduit, the walls of the conduit being shaped to reduce pressure losses through the bowed coolant channel. For example, the walls may diverge from the outlet port towards a radially distal exit hole. Optionally an extending portion of the wall adjacent the exit hole may have non-convergent walls.

In some embodiments, the bowed coolant channel is adapted for increased heat exchange by the provision of a non-planar surface on the skirt facing side of the radially extending wall. The non-planar surface may comprise an arrangement of recesses or protrusions which increase the surface area of the face. The arrangement may be in a repeating pattern. The recesses or protrusions can be configured for aerodynamic performance whereby to optimise coolant flow across the surface. Protrusions may extend between the skirt face and the opposing face of the radially outwardly extending wall to provide support to the annular cooling apparatus. For example, protrusions may be in the form of pedestals or ribs. In alternative embodiments the coolant channel may house a volume of porous heat exchanging material. The volume may substantially fill the radially extending channel portion. These pedestals or ribs can also be designed to provide structural support to the passage and/or to aid building by an additive layer manufacturing (ALM) method.

The radially outwardly extending wall may diverge from the plane of the nozzle exit to provide a convex or conical outer surface. The opposing face of the skirt may diverge in alignment with the radially outwardly extending wall. This may be parallel to or angled with respect to the heat shield and optionally concentric with air swirler exit.

The radially extending wall may be contiguous with the nozzle. Optionally, the radially extending wall is formed integrally with the nozzle. The radially extending wall may be further configured to serve, in use, as a heat shield, providing an air swirler with an integral heat shield.

The arrangement is particularly advantageous in combination with a jet in cross-flow fuel injector arrangement. In cone spray fuel injection arrangements, the nozzle of the fuel injector is partly shielded from combustion heat by the expansive fuel spray. Jets in cross-flow injectors have the potential to reduce droplet size, thereby increasing evaporation rate. However, this reduces the protection that the fuel spray nozzle receives from the spray. Together with increasing inlet temperatures and richer primary zones (producing more radiation) the fuel spray nozzle requires better cooling than has been previously required. The proposed arrangement provides improved cooling both to the nozzle and the heat shield by passing a continuous flow of cooling air through the bowed channel.

The skirt may be integrally formed with the nozzle and/or the radially extending wall. An integrally formed radially extending wall, skirt and nozzle may be designed for manufacture using an additive layer manufacturing method.

In another aspect, the invention comprises a gas turbine engine incorporating a fuel spray nozzle and associated apparatus as described above.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF DRAWINGS AND EMBODIMENTS

Figure 1:
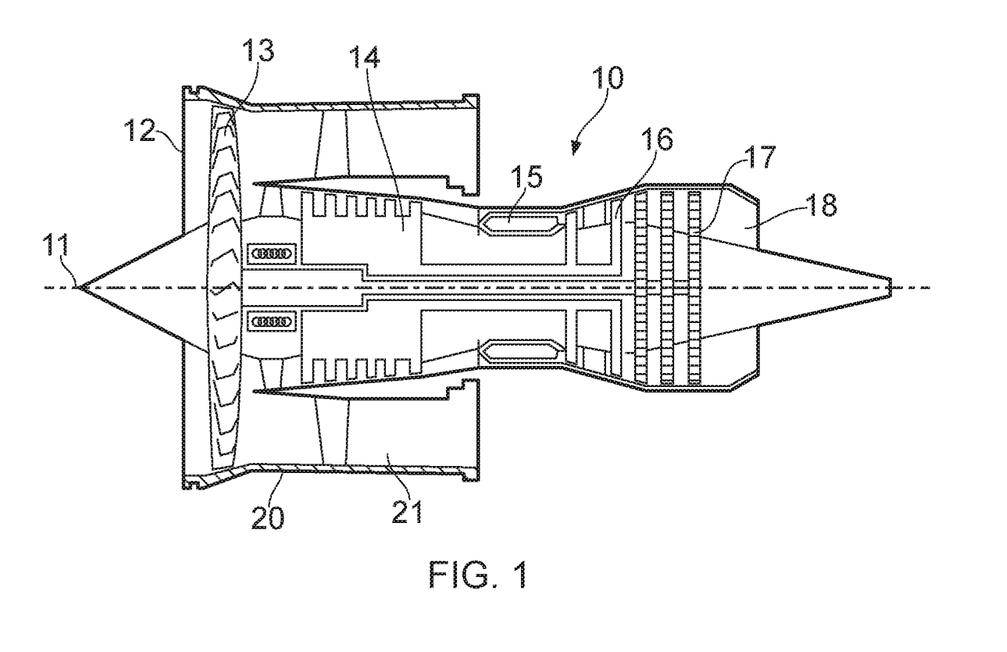
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, a high-pressure compressor 14, combustion equipment 15, a high-pressure turbine 16, a low-pressure turbine 17 and an exhaust nozzle 18. A nacelle 20 generally surrounds the engine 10 and defines the intake 12.

The gas turbine engine 10 works in the conventional manner so that air entering the intake 12 is accelerated by the fan 13 to produce two air flows: a first air flow into the high-pressure compressor 14 and a second air flow which passes through a bypass duct 21 to provide propulsive thrust. The high-pressure compressor 14 compresses the air flow directed into it before delivering that air to the combustion equipment 15.

In the combustion equipment 15 the air flow is mixed with fuel and the mixture combusted. The resultant hot combustion products then expand through, and thereby drive the high and low-pressure turbines 16, 17 before being exhausted through the nozzle 18 to provide additional propulsive thrust. The high 16 and low 17 pressure turbines drive respectively the high pressure compressor 14 and the fan 13, each by suitable interconnecting shaft.

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan. The engine may be configured as a turbojet engine. The invention is applicable to any of this variety of engine configurations.

Figure 2:
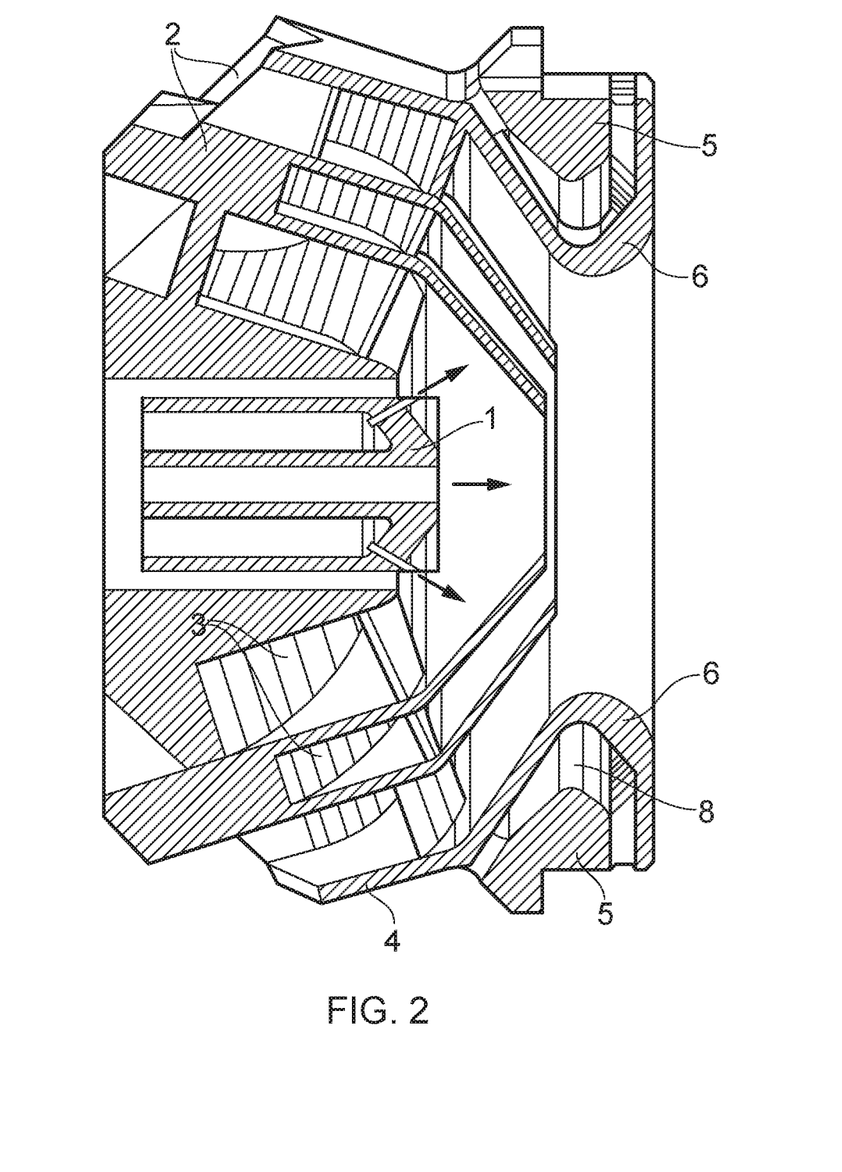
FIG. 2 is a sectional side view of an apparatus according to an embodiment of the invention.

A proportion of the air exiting the compressor section is diverted past a fuel spray nozzle and enters the cooling apparatus of the present invention (which is annular to the fuel spray nozzle) at an inlet to the bowed coolant channel 8 (see FIG. 2). This air is relatively cooler than that in the combustion chamber and so serves as a coolant fluid, protecting surfaces of the fuel spray nozzle and a heat shield separating the meter panel of the combustion chamber from excessive heat so as to retain mechanical properties of these components and maintain structural integrity of the combustor.

FIG. 2 shows a sectional side view of an apparatus according to an embodiment of the invention. As can be seen, a fuel supply pipe 1 sits at the centre of concentrically arranged channels 2 of an air swirler. The annular channels 2 have radially extending swirl vanes 3. The outermost channel is enclosed by a radially outermost channel wall 4. The wall 4 is radially divergent at its downstream end and terminates a short distance downstream of the exit of fuel supply pipe 1. In use, fuel is sprayed from pipe 1 and mixes with swirled, accelerated air exiting the channels 2. The mixture is directed into a combustion chamber downstream of the fuel spray nozzle 1,2,3,4 and ignited. A wall 6 extends from the downstream terminus of the wall 4 and turns to extend radially outwardly defining an annular groove. A skirt portion 5 is arranged in the groove and together wall 6 and the skirt portion 5 define a bowed coolant channel 8.

Figure 3:
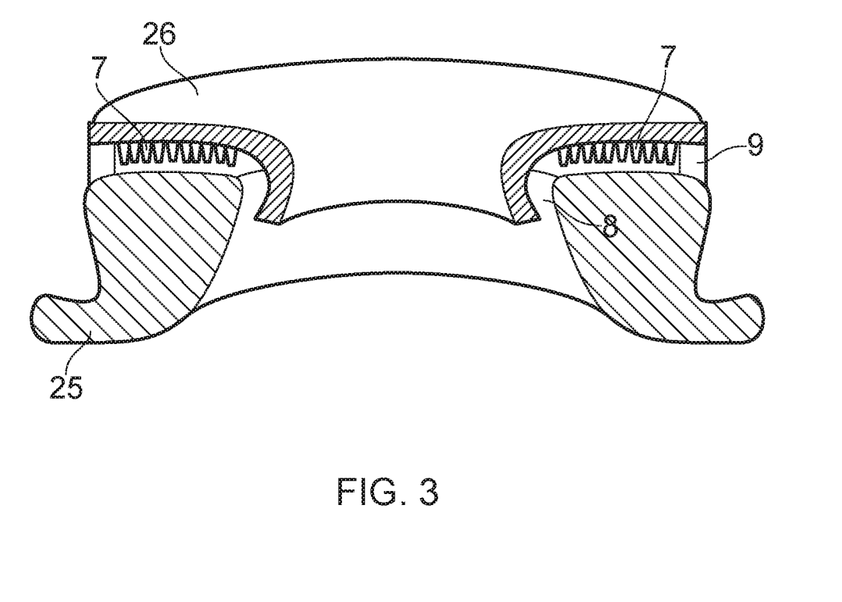
FIG. 3 is a schematic sectional view of a cooling apparatus suited to use in an apparatus in accordance with the present invention.

FIG. 3 shows a sectional view of an embodiment of cooling apparatus similar to that defined by the wall 6, skirt 5 and channel 8 of FIG. 2. In FIG. 3, the bowed coolant channel 8 is defined by skirt 25 and radially extending wall 26. As can be seen, a channel facing surface of wall 26 is provided with an array of pedestal like protrusions 7 which project into the radially extending portion of the bowed channel 8. At the radially outer extreme, an array of conduit walls 9 connects the skirt 25 with the wall 26 and defines outlet conduits through which coolant air exits the bowed channel 8. In an optional alternative configuration, the skirt may be allowed to float, this can reduce thermal stresses on the cooling apparatus.

Figure 4:
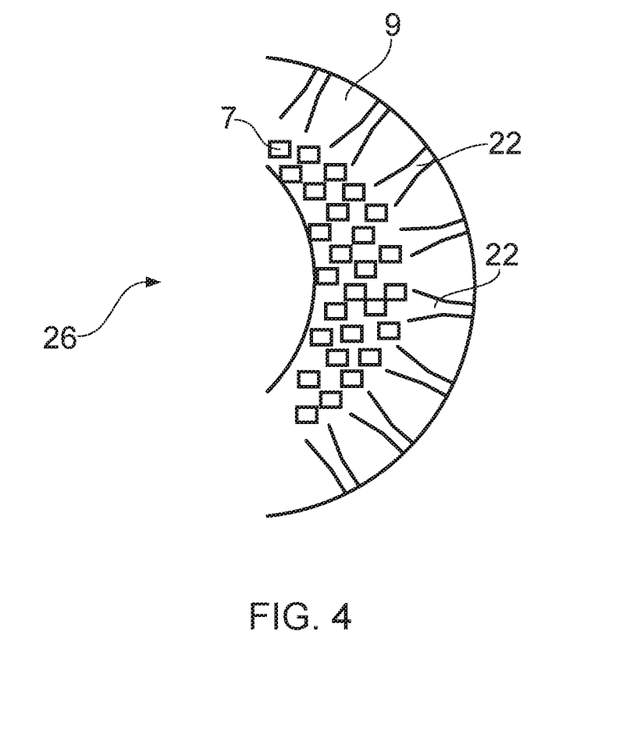
FIG. 4 is a schematic view of an inner surface of a cooling apparatus suited to use in an apparatus in accordance with the present invention.

FIG. 4 shows an inner surface of a cooling apparatus, the surface is the channel facing surface of wall 26. As can be seen pedestal like projections 7 cover a substantial part of the surface. Adjacent the radially outer edge is a radial array of conduits 22 defined by walls 9. The conduits 22 include a radially inner divergent portion and a radially outer portion with parallel aligned walls. The configuration of these conduits is not limited to this construction, though it is one of a number of which the skilled addressee will appreciate can serve to reduce pressure losses through the bowed coolant channel.

Figure 5:
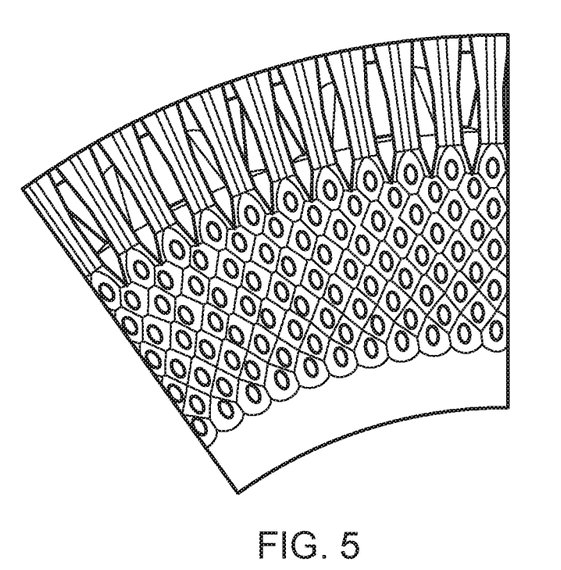
FIG. 5 is a schematic showing fluid volume in a radial plane within a cooling apparatus suited to use in an apparatus in accordance with the present invention.
Figure 6:
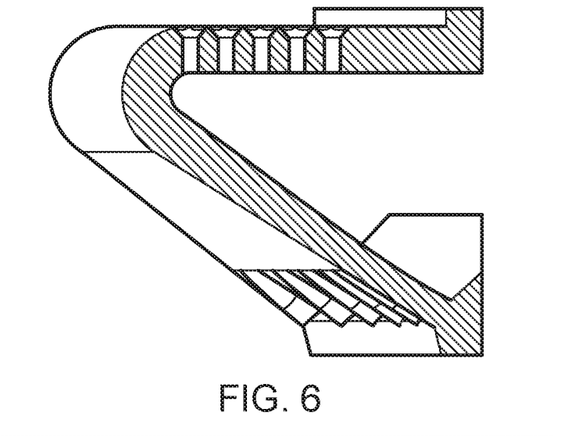
FIG. 6 is a schematic showing fluid volume in an axial plane within a cooling apparatus suited to use in an apparatus in accordance with the present invention.
Figure 7:
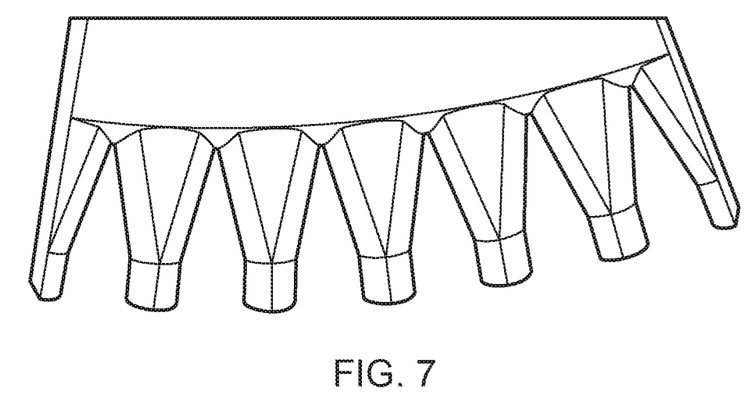
FIG. 7 is a schematic showing fluid volume in a radial plane within a cooling apparatus suited to use in an apparatus in accordance with the present invention.

FIGS. 5, 6 and 7 illustrate in different views the fluid volume within the cavities defined by the cooling apparatus 22, 25, 26, 7, 8, 9.

Figure 8:
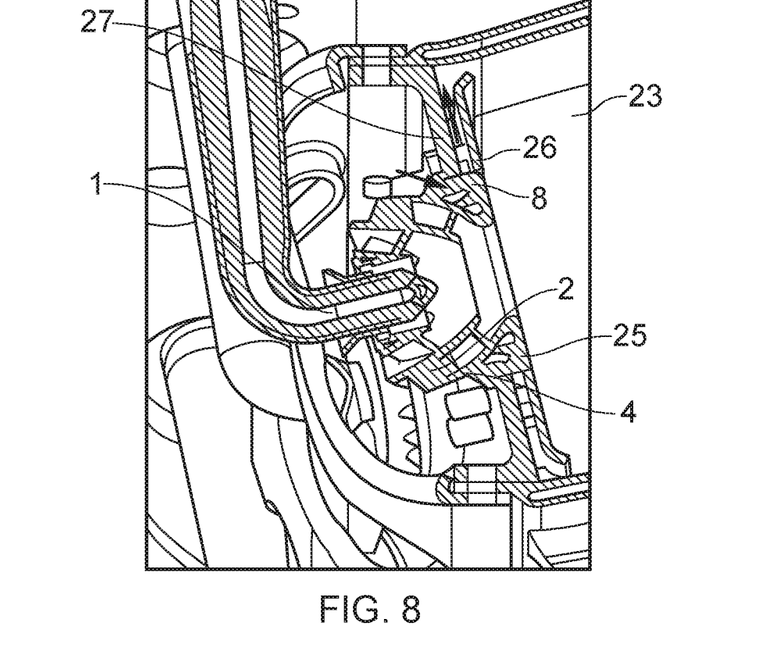
FIG. 8 shows a section through a first embodiment of an apparatus according to the present invention.

FIG. 8 shows a section through an embodiment of an apparatus according to the present invention. The same reference numerals are used to identify similar components to those shown in FIGS. 3 and 4. The thick black arrows illustrate the path travelled by coolant air through the cooling apparatus, 25, 26, 8. The radially extending wall 25 of the cooling apparatus in this arrangement serves also as a heat shield separating the fuel spray nozzle components 1, 2, 4 from combustion chamber 23. As can be seen, coolant air is fed between the meter panel 27 and heat shield 26 to provide cold side cooling to the heat shield 26. Alternatively, cooling air could be fed to the hot side of heat shield 26 to provide a protective cooling film.

Figure 9:
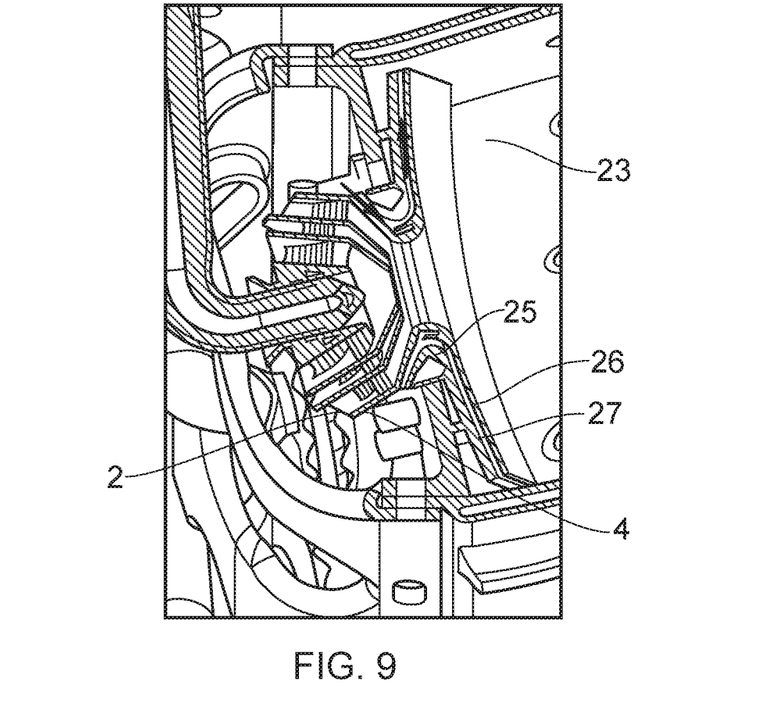
FIG. 9 shows a section through a second embodiment of an apparatus according to the present invention.

FIG. 9 shows an alternative embodiment to that of FIG. 8 in which the wall/heat shield 26 is slightly conical and extends to protect the meter panel 27.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An arrangement comprising:
  an annular air swirler configured to receive a fuel injector in a central bore thereof and having one or more annular channels, each of the one or more annular channels having (i) an inlet for receiving compressed air, (ii) an axially distal outlet, (iii) radially facing channel walls converging radially inwardly towards the outlet, and (iv) swirl vanes extending between opposing faces of the channel walls and being configured for turning the compressed air to create a vortex at the outlet; and
  an annular cooling apparatus arranged axially downstream of the swirl vanes of the one or more annular channels, the annular cooling apparatus comprising:
    a skirt portion radially spaced from a converging portion of a radially outermost one of the channel walls, the skirt portion and the converging portion of the radially outermost one of the channel walls defining a radially converging portion of a bowed coolant channel, and
    a radially outwardly extending wall (i) connected with the radially outermost one of the channel walls adjacent the outlet of a radially outermost one of the one or more annular channels and (ii) defining, with at least one radially extending face of the skirt portion, a radially outwardly extending portion of the bowed coolant channel, the radially outwardly extending portion of the bowed coolant channel being downstream of the radially converging portion of the bowed coolant channel,
  wherein:
    the bowed coolant channel is adapted for increased heat exchange and is configured to direct the compressed air across the radially outermost one of the channel walls and the radially outwardly extending wall to shield, in use, the air swirler from heat generated in a combustion chamber;
    at the radially outwardly extending portion of the bowed coolant channel, at least a part of the radially outwardly extending wall is located farther downstream than the at least one radially extending face of the skirt portion; and
    at the radially outwardly extending portion of the bowed coolant channel, a virtual line extending parallel to an axis of the air swirler and the annular cooling apparatus intersects both the radially outwardly extending wall and the at least one radially extending face of the skirt portion.

2. The arrangement as claimed in claim 1, wherein an upstream end wall of the bowed coolant channel includes an annular arrangement of inlet ports.

3. The arrangement as claimed in claim 1, wherein an outlet of the radially outwardly extending portion of the bowed coolant channel has a circumferential array of outlet ports.

4. The arrangement as claimed in claim 3, wherein each port of the array of outlet ports contains a conduit, walls of the conduit being shaped to reduce pressure losses through the bowed coolant channel.

5. The arrangement as claimed in claim 4, wherein the walls of the conduit diverge from an inlet of the port towards a radially distal exit hole.

6. The arrangement as claimed in claim 5, wherein the walls of the conduit are non-convergent at an extending portion adjacent the exit hole.

7. The arrangement as claimed in claim 1, wherein a surface on a skirt-facing-side of the radially outwardly extending wall is non-planar.

8. The arrangement as claimed in claim 7, wherein the non-planar surface comprises an arrangement of recesses or protrusions that increase surface area of the surface.

9. The arrangement as claimed in claim 8, wherein the recesses or the protrusions are arranged in a repeating pattern.

10. The arrangement as claimed in claim 7, wherein protrusions extend between the at least one radially extending face of the skirt portion and an opposing face of the radially outwardly extending wall to provide support to the annular cooling apparatus.

11. The arrangement as claimed in claim 1, wherein the radially outwardly extending wall is integral with the radially outermost one of the channel walls.

12. The arrangement as claimed in claim 1, wherein the skirt portion is integral with at least one of the radially outwardly extending wall and a nozzle of the fuel injector.

13. The arrangement as claimed in claim 1,
    wherein the air swirler is mounted on a pipe of the fuel injector.

14. The arrangement as claimed in claim 1, wherein the radially outermost one of the channel walls and the radially outwardly extending wall form a continuous, uninterrupted surface that faces the skirt portion and defines the radially converging portion and the radially outwardly extending portion of the bowed coolant channel.

15. The arrangement as claimed in claim 1, wherein the virtual line intersects both (i) a part of the radially outwardly extending wall and (ii) a face of the at least one radially extending face of the skirt portion that are each oriented perpendicularly to the axis of the air swirler and the annular cooling apparatus.

16. The arrangement as claimed in claim 15, wherein (i) another part of the radially outwardly extending wall extends in a direction with an axial component and (ii) another face of the at least one radially extending face of the skirt portion is on an opposite side of the bowed coolant channel from the other part.

* * * * *